United States Patent [19]

Moore et al.

[11] Patent Number: 4,505,972
[45] Date of Patent: Mar. 19, 1985

[54] CRACK PROPAGATION RESISTANT ACRYLIC SHEET

[75] Inventors: Thomas S. Moore, Maryville; Delmas B. Pennington, Powell, both of Tenn.

[73] Assignee: Rohm and Haas Company, Philadelphia, Pa.

[21] Appl. No.: 551,246

[22] Filed: Nov. 14, 1983

Related U.S. Application Data

[63] Continuation-in-part of Ser. No. 478,135, Mar. 23, 1982, abandoned.

[51] Int. Cl.³ ............................ E06B 5/10; F41H 5/26
[52] U.S. Cl. ...................................... 428/220; 49/171; 89/; 109/49.5; 109/58.5; 264/216; 273/410; 428/522; 428/911; 525/228; 526/328.5; 526/329.7
[58] Field of Search ............. 428/220, 911, 522; 109/49.5, 58.5; 526/328.5, 329.7; 49/171; 89/36 R; 220/82 R; 273/410; 264/216; 525/228

[56] References Cited

U.S. PATENT DOCUMENTS 3,865,619  2/1975  Penneweiss et al. ................. 428/412
4,368,235  1/1983  Vaughn ................................ 428/447

OTHER PUBLICATIONS

Chemical Abstracts, 78:138011k, (1973).
Chemical Abstracts, 80:135067z, (1974).
Chemical Abstracts, 81:121265w, (1974).
Chemical Abstracts, 84:18343h, (1976).
Chemical Abstracts, 87:23886d, (1977).
Chemical Abstracts, 93:74004w, (1980).
Chemical Abstracts, 94:165703k, (1981).
Chemical Abstracts, 97:73205h, 145365k, (1982).

*Primary Examiner*—James C. Cannon
*Attorney, Agent, or Firm*—Marc S. Adler

[57] ABSTRACT

Improved crack propagation resistant acrylic sheets are provided: These sheets are prepared by copolymerizing methyl methacrylate with minor amounts of lower alkyl ($C_2$–$C_4$) methacrylates. One and one quarter inch thick sheets polymerized from a monomer mixture of about 88 weight percent methyl methacrylate and about 12 weight percent butyl methacrylate or from about 76 weight percent methyl methacrylate and about 24 weight percent ethyl methacrylate are useful as indoor and outdoor ballistic glazing materials.

22 Claims, No Drawings

CRACK PROPAGATION RESISTANT ACRYLIC SHEET

BACKGROUND OF THE INVENTION

This application is a continuation-in-part of copending U.S. patent application Ser. No. 478,135 filed on Mar. 23, 1982 now abandoned.

This invention relates to acrylic copolymer sheets having improved crack propagation resistance, and more particularly to acrylic sheets copolymerized from a major amount of methyl methacrylate and from a minor amount of a lower alkyl ($C_2$–$C_4$) methacrylate which are acceptable for selected ballistic glazing applications.

Optically clear, crack propagation resistant plastic sheets have been developed as an alternative to glass for use in a number of applications including furniture and glazing. Ballistic glazing or "bullet-resisting" glazing is a specialized application which requires very high resistance to crack propagation. Ballistic glazing applications include security barriers in banks, offices, and stores, as well as in specialized vehicles, such as armored car windows, for protection against armed robbery.

In order for a material to be commerically accepted as being effective for ballistic glazing applications, the material must qualify as a "bullet-resisting" material by repeatedly passing an industry-wide certification test procedure. This test is administered by an independent, non-profit organization, Underwriter's Laboratories, Inc. (UL). Underwriter's Laboratories publishes a test procedure for ballistic glazing (UL-752). This procedure describes how the tests are conducted, what weapons are used, what qualifies as passing, and the rating assigned to the material passing the test. The UL-752 test for medium power small arms rating (UL-752 MPSA) and for high power small arms rating (UL-752 HPSA), which are referred to in pertinent part herein, is hereby incorporated by reference into this application. Broadly, in order for a plastic sample to become certified according to UL-752 (MPSA) or (HPSA) for indoor and outdoor ballistic glazing applications, the material must not allow three things to occur when fired upon: (1) the material must not allow the projectile to penetrate through the material; (2) the material must not spall on the protected side of the test sample, opposite the side which is being fired upon, to the extent that fragments of the material become imbedded into or damage a cardboard indicator positioned at a predetermined distance (18 inches) from the protected side of the sample; and (3) the firings must not create an opening of sufficient size in the material to permit the insertion therein of the muzzle of the weapon used for the test. Samples for use in indoor applications must pass this test after being subjected to high temperatures, of about 95° F., and low temperatures of about 55° F. Samples certified for use in outdoor applications must pass this test after being subjected to a high temperature of about 120° F., and low temperatures. The low temperature test requires one side of the material to be subjected to about minus 25° F. while the other side is subjected to room temperature (about 72° F.). For plastic sheet this low temperature test (outdoor certification) is the most difficult of the tests to pass, while for laminated glass the high temperature test is the most difficult. In the UL tests, a sample is typically fired upon three times. The shots are spaced 4 ($\pm \frac{1}{2}$) inches apart, in a triangular pattern, in the approximate center of the test sample.

The impact from the first shot fired at the sample may create a site for crack propagation when the sample is fired upon the second and the third time. Therefore, resistance to crack propagation is a very important criterion, as is repeated testing of the sample under actual test conditions, in determining whether a particular material will pass the UL-752 certification and be effective as a ballistic glazing material.

At the present time, commercial crack propagation and bullet-resisting plastic sheets include those prepared from polymethyl methacrylate, polymethyl methacrylate copolymerized with less than about 2 weight percent ethyl acrylate, and laminates of polymethyl methacrylate and polycarbonate. These conventional materials have not, however, been found to be completely satisfactory in their ease or cost to manufacture, or in their ability to repeatedly pass the ballistic tests, especially the severe low temperature test. The inability to predict whether a certain material of a known composition will pass the certification test is a troublesome problem to plastic sheet manufacturers. This unpredictability is believed to be caused by such factors as small variances in the thickness of the sheet to be tested, variances in bullet velocity, variances in the temperature of the sample during testing, and the partially subjective nature of the spalling requirement, item 2, of the test itself as described above.

It is therefore an object of this invention to provide acrylic copolymers having improved crack propagation resistance.

It is also an object of the invention to provide crack propagation resistant materials which are easily prepared by conventional techniques and which are of low cost.

It is a further object of this invention to provide acrylic copolymers which meet the requirements of a ballistic glazing material.

SUMMARY OF THE INVENTION

Acrylic materials copolymerized from a major amount of methyl methacrylate, ranging from about 76 to above 94 weight percent, and a minor amount of a lower alkyl ($C_2$–$C_4$) methacrylate, ranging from about 12 weight percent to about 24 weight percent ethyl methacrylate and from about 6 weight percent to about 14 weight percent butyl methacrylate, have been found to be effective crack propagation resistant materials. Certain of these acrylic materials have been unexpectedly found to meet the requirements for use as ballistic glazing applications.

Furthermore, acrylic materials copolymerized from about 24 weight percent ethyl methacrylate and about 76 weight percent methyl methacrylate and from about 12 weight percent butyl methacrylate and about 88 weight percent methyl methacrylate have been found to be effective for use in both indoor and outdoor ballistic glazing applications.

DETAILED DESCRIPTION OF THE INVENTION

In order to determine if an improved acrylic material having high crack propagation resistance under ballistic testing conditions as compared to conventional polymethyl methacrylate could be obtained, we prepared a number of polymethyl methacrylate and polymethyl methacrylate copolymer sheets containing various types and amounts of acrylic comonomers. These comonomers were selected because of their low glass transition (Tg) temperature. The incorporation of lower Tg comonomers with polymethyl methacrylate was hypothesized to lead to softer polymethyl methacrylate sheet having decreased modulus properties, improved deflection under ballistic impact, and increased crack propagation resistance. The comonomers selected for the experiment included ethyl acrylate, butyl acrylate, 2-ethylhexylacrylate, lower alkyl ($C_2$–$C_4$) methacrylates and higher alkyl ($C_{12}$–$C_{18}$) methacrylates.

The acrylic materials of this invention may be prepared by any conventional copolymerization technique, such as sheet casting, injection molding, melt calendaring, etc. The samples prepared for testing were sheets having an average thickness of about 1.250 inches. The range of thicknesses for individual samples, as illustrated by the examples which follow, ranged from 1.193 to 1.311 inches.

The preferred method used to prepare the samples for testing was a standard sheet casting technique utilizing the following steps. A monomer mixture was prepared. This mixture contained methyl methacrylate and the comonomer, if any, as well as very small quantities of typical additives, including ultraviolet light absorbers, dirt suppressants, polymerization moderators, mold release or parting agents, toners, and catalysts. The aggregate concentration of the additives used was minor and typically less than one percent of the monomer mixture. The monomer mixture was agitated and poured into a standard cell casting mold. The mold was then placed in an oven at elevated temperature and pressure until copolymerization was complete. The mold was then cooled and the pressure was reduced. The mold was then removed from the oven, disassembled, and the polymerized cast sheet was removed.

The cast sheets were then cut to test sample size, of approximately one foot square, finished so that no imperfections, such as air bubbles and the like, were visible, and transferred to an independent ballistic testing laboratory, H. P. White Laboratory, Inc., Street, Maryland, for ballistic tests. This laboratory tested each sample in compliance with the UL-752 (MPSA) or (HPSA) test procedure. A super .38 caliber automatic (STAR®) weapon having a barrel length of 5 inches was used for the MPSA tests. The ammunition was 130 grain FMJ (full metal jacket), both factory-loaded and hand-loaded. The muzzle velocity of the bullet was determined for each firing and averaged for each sample tested. The average bullet velocity of most sample firings was about 1280 ft./sec. (±21 ft./sec.) in accordance with UL-752 (MPSA). a .357 Magnum revolver (Smith and Wesson® Model 27) having a barrel length of 8¼ inches was used for the HPSA tests. The ammunition was 158 grain SP (soft point-no jacket) factory-loaded. The muzzle velocity of the .357 Magnum bullets averaged 1,372 ft./sec. (±29 ft./sec.) in accordance with UL-752 (HPSA). All samples were temperature conditioned according to UL-752 (MPSA).

The response of the sample to each bullet fired was examined to determine if it passed the three requirements of the UL test, and the cracks formed were visibly recorded and categorized as surface mark only, cone fracture, linear crack, star crack, hole, light spall or heavy spall for each shot fired. Six samples of each composition were tested and each sample was fired upon three times in a triangular pattern, as required in UL-752. Therefore, each sheet cast composition prepared was tested eighteen times at each temperature. The percentage of the samples which cracked and which passed the UL-752 certification test was determined on a per bullet (18 total) basis.

The average data for UL-752 (MPSA) tests for 32 sets of 6 samples each are presented in Table I. The Table illustrates that polymethyl methacrylate containing no comonomer (Examples 1 and 2) cracked 100% of the time and passed the UL test only 78 to 72% of the time at either temperature. This performance was confirmed with commercial Polycast® Sheet manufactured by Polycast, Inc. (Examples 3 and 4). The polymethyl methacrylate sheets, therefore, due to their high percentage crack cannot be relied upon to pass the certification procedure more than about three quarters of the time. Samples prepared with 1.75 weight percent ethyl acrylate, (Examples 5 and 6) performed about the same as the polymethyl methacrylate samples. The butyl acrylate/methyl methacrylate samples (Examples 7 and 8–10) prepared from 9 and 12 weight percent butyl acrylate, respectively, did not pass the room temperature or low temperature ballistic test, respectively. Samples prepared with 12 weight percent 2-ethylhexyl acrylate comonomer also did not pass the low temperature ballistic test.

Examples 13–32 present the results of the ballistic tests on samples of lower alkyl ($C_2$–$C_4$) and higher alkyl ($C_{12}$–$C_{18}$) methacrylate/methyl methacrylate copolymer sheets. Since lower alkyl acrylates have lower glass transition temperatures than the corresponding lower alkyl methacrylates, it was thought that the methyl methacrylate/lower alkyl methacrylate copolymer samples would exhibit less deflection, impact absorption, and crack resistance than corresponding copolymers formed from equal concentrations of lower alkyl acrylate comonomers. This result was unexpectedly not confirmed by the ballistic tests.

A copolymer prepared from 88 weight percent methyl methacrylate and 12 weight percent ethyl methacrylate (Example 13) showed a zero (0%) percentage crack and passed the ballistic test 100% of the time at ambient temperature. The ambient temperature test was repeated with samples of methyl methacrylate copolymerized with 14 weight percent (Example 15) and 24 weight percent (Example 17) ethyl methacrylate. The 14 weight percent sample (Example 15) resulted in a 0% crack and a 100% pass rate, while the 24 weight percent sample (Example 17) resulted in a 0% crack and 100% pass rate.

These three methyl methacrylate/ethyl methacrylate copolymers were also tested at low temperature (minus 25° F.). The 12% and 14% ethyl methacrylate samples (Examples 14 and 16) did not pass this ballistic test 100% of the time, however, the 24% ethyl methacrylate sample (Example 18) did pass the low temperature ballistic test 100 percent of the time.

Copolymers prepared from 94% methyl methacrylate and 6% butyl methacrylate (Example 19) showed intermediate (56%) percentage crack and passed the test 94% of the time at ambient temperature. The test was repeated at ambient temperature on samples of methyl methacrylate copolymerized with 8 weight percent (Example 20), 10 weight percent (Example 23), 12 weight percent (Example 25), and 14 weight percent (Example 27) butyl methacrylate. The 8 weight percent samples (Example 20) and the 12 weight percent (Example 25) exhibited no percentage crack and a 100% pass rate, while the 10 weight percent (Example 23) and 14 weight percent (Example 27) samples showed low percentage crack (11 and 6%, respectively) and also 100% pass rates.

The 10 weight percent (Examples 22 and 24), 12 weight percent (Example 26), and 14 weight percent (Example 28) samples were also tested at low temperature (minus 25° F.). While the 10 weight percent samples showed a higher crack rate (61%), only 1 sample out of 36 shots fired failed the test (94% pass, Example 24). The 14 weight percent samples (Example 28) also showed a higher percentage crack (83%), but all samples passed the test.

The preferred 12 weight percent samples (Example 26) exhibited the lowest percent crack at low temperature and passed the test 100% of the time. The physical properties of the 12 weight percent butyl methacrylate/88 weight percent methyl methacrylate copolymer cast sheet are illustrated in Table II.

Copolymers prepared from higher alkyl methacrylates such as dodecyl methacrylate (Examples 29 and 30) and octadecyl methacrylate (Examples 31 and 32) were also prepared and tested. The sheets had an unacceptable yellow color, were difficult to prepare and did not pass the ballistic tests 100% of the time at either the ambient or low temperature conditions even at reduced bullet velocities (approximately 1,175 ft./sec.).

We have also found that coating the preferred acrylic sheet, prepared from 12 weight percent butyl methacrylate and 88 weight percent methyl methacrylate, with abrasion resistant coatings conventionally used with methyl methacrylate sheets did not impair the ballistics performance of the acrylic sheets of the invention at ambient or low temperature conditions.

The average data for UL-752 (HPSA) tests for 3 sets of 6 samples each are presented in Table III. The table illustrates that a copolymer prepared from 88 weight percent methyl methacrylate and 12 weight percent butyl methacrylate (Example 33) showed a 6% crack and passed the ballistic test 100% of the time at 55° F. This 100% passing performance was replicated (Examples 34 and 35) although percent cracking was somewhat higher (11% and 72%, respectively).

Other comonomers such as ethyl methacrylate, dodecyl methacrylate, and octadecyl methacrylate did not pass the UL-752 HPSA test 100% of the time and percent crack was 100% in each case (Example 36-38).

Therefore, we have found that acrylic materials prepared by the copolymerization of from about 6 to about 24 weight percent lower alkyl ($C_2$-$C_4$) and from about 94 to about 76 weight percent methyl methacrylate are more highly crack propagation resistant than polymethyl methacrylate and are suitable for indoor ballistic glazing applications. Acrylic sheets prepared by copolymerizing about 12 weight percent butyl methacrylate and about 88 weight percent methyl methacrylate and from about 24 weight percent ethyl methacrylate and 76 weight percent methyl methacrylate have extremely high crack propagation resistance and are acceptable for both indoor and outdoor ballistic glazing applications. It is believed that the preferred copolymer sheets prepared from minor amounts of lower alkyl ($C_2$-$C_4$) methacrylate and major amounts of methyl methacrylate having thicknesses greater than 1.250 inches would also exhibit the same crack propagation resistance exhibited by the 1.250 inch thick samples tested.

TABLE I

UL-752 (MPSA) BALLISTIC PERFORMANCE DATA ON "1.250" INCH CAST SHEET

| Example | Cast Sheet Composition | | | Test Temp. °F. | Thickness of Sheet at Impact (inches) | Avg. Bullet Velocity (ft./sec.) | % Crack | % Pass |
|---|---|---|---|---|---|---|---|---|
| | MMA[1] Wt. % | Comonomer Type | Wt. % | | | | | |
| 1 | 100 | None | — | 65 | 1.193 | 1247 | 100 | 78 |
| 2 | 100 | None | — | −25 | 1.248 | 1267 | 100 | 72 |
| *3 | 100 | None | — | 55 | 1.233 | 1279 | 100 | 72 |
| *4 | 100 | None | — | −25 | 1.251 | 1270 | 100 | 72 |
| 5 | 98.25 | EA[2] | 1.75 | 55 | 1.267 | 1295 | 100 | 44 |
| 6 | 98.25 | EA | 1.75 | −25 | 1.291 | 1280 | 100 | 61 |
| 7 | 91.0 | BA[3] | 9.0 | 55 | 1.264 | 1278 | 100 | 0 |
| 8 | 88.0 | BA | 12.0 | 55 | 1.252 | 1280 | 100 | 44 |
| 9 | 88.0 | BA | 12.0 | 55 | 1.299 | 1283 | 100 | 50 |
| 10 | 88.0 | BA | 12.0 | −25 | 1.311 | 1282 | 100 | 0 |
| 11 | 88.0 | 2-EHA[4] | 12.0 | 55 | 1.271 | 1279 | 100 | 78 |
| 12 | 88.0 | 2-EHA | 12.0 | −25 | 1.295 | 1278 | 100 | 0 |
| 13 | 88 | EMA[5] | 12 | 55 | 1.275 | 1290 | 0 | 100 |
| 14 | 88 | EMA | 12 | −25 | 1.265 | 1298 | 100 | 67 |
| 15 | 86 | EMA | 14 | 75 | 1.212 | 1176 | 0 | 100 |
| 16 | 86 | EMA | 14 | −25 | 1.253 | 1178 | 100 | 83 |
| 17 | 76 | EMA | 24 | 75 | 1.205 | 1173 | 0 | 100 |
| 18 | 76 | EMA | 24 | −25 | 1.251 | 1176 | 56 | 100 |
| 19 | 94.0 | BMA[6] | 6.0 | 65 | 1.242 | 1273 | 56 | 94 |
| 20 | 92.0 | BMA | 8.0 | 65 | 1.248 | 1262 | 0 | 100 |
| 21 | 90.0 | BMA | 10.0 | 55 | 1.263 | 1293 | 44 | 100 |
| 22 | 90.0 | BMA | 10.0 | −25 | 1.267 | 1279 | 61 | 100 |
| 23 | 90.0 | BMA | 10.0 | 55 | 1.289 | 1293 | 11 | 100 |
| 24 | 90.0 | BMA | 10.0 | −25 | 1.279 | 1289 | 61 | 94 |
| 25 | 88.0 | BMA | 12.0 | 65 | 1.254 | 1262 | 0 | 100 |
| 26 | 88.0 | BMA | 12.0 | −25 | 1.302 | 1280 | 33 | 100 |
| 27 | 86.0 | BMA | 14.0 | 65 | 1.268 | 1265 | 6 | 100 |
| 28 | 86.0 | BMA | 14.0 | −25 | 1.294 | 1264 | 83 | 100 |
| 29 | 91 | DDMA[7] | 9 | 75 | 1.255 | 1170 | 83 | 83 |
| 30 | 91 | DDMA | 9 | −25 | 1.256 | 1175 | 100 | 17 |
| 31 | 90 | ODMA[8] | 10 | 75 | 1.257 | 1179 | 100 | 78 |

TABLE I-continued

UL-752 (MPSA) BALLISTIC PERFORMANCE DATA ON "1.250" INCH CAST SHEET

| Example | Cast Sheet Composition MMA[1] Wt. % | Comonomer Type | Wt. % | Test Temp. °F. | Thickness of Sheet at Impact (inches) | Avg. Bullet Velocity (ft./sec.) | % Crack | % Pass |
|---|---|---|---|---|---|---|---|---|
| 32 | 90 | ODMA | 10 | −25 | 1.257 | 1184 | 100 | 0 |

[1]MMA = methyl methacrylate
[2]EA = ethyl acrylate
[3]BA = butyl acrylate
[4]2-EHA = 2-ethylhexyl acrylate
[5]EMA = ethyl methacrylate
[6]BMA = butyl methacrylate
[7]DDMA = dodecyl methacrylate
[8]ODMA = octadecyl methacrylate
*Polycast ® Sheet

TABLE II

PHYSICAL PROPERTIES OF BUTYL METHACRYLATE (12 WT. %)/ METHYL METHACRYLATE (88 WT. %) COPOLYMER CAST SHEET

| Test | Property | Units | Value |
|---|---|---|---|
| Flexural Strength[1] | Flexural Stress at Max. | psi | 15,300 |
| Flexural Strength[1] | Flexural Stress at Break | psi | 15,100 |
| Flexural Strength[1] | Modulus of Elasticity | psi | 424,000 |
| Tensile Strength[2] | Tensile Stress at Max. | psi | 10,100 |
| Tensile Strength[2] | Tensile Stress at Break | psi | 10,100 |
| Tensile Strength[2] | Elongation at Break | Percent | 4.6 |
| Tensile Strength[2] | Modulus Elasticity | psi | 397,000 |
| Deflection Temp. under Flexural Load[3] | Temperature at 10 Mil Deflection | °F. °C. | 205 96 |
| Rockwell Hardness[4] | Hardness | M scale | 97 |
| Barcol Number | Hardness | — | 46 |
| Transmittance[5] | Transmittance | Percent | 91 |
| Haze[6] | Haze | Percent | 0.4 |

[1]ASTM D-790-66
[2]ASTM D-638-77
[3]ASTM D-648-72 at 264 psi
[4]ASTM D-785-65
[5]ASTM D-1003
[6]ASTM D-1003

TABLE III

UL-752 (HPSA) BALLISTIC PERFORMANCE DATA ON "1.250" INCH CAST SHEET

| Example | Cast Sheet Composition MMA[1] Wt. % | Comonomer Type | Wt. % | Test Temp. °F. | Thickness of Sheet at Impact (inches) | Avg. Bullet Velocity (ft./sec.) | % Crack | % Pass |
|---|---|---|---|---|---|---|---|---|
| 33 | 88 | BMA[1] | 12 | 55 | 1.309 | 1374 | 6 | 100 |
| 34 | 88 | BMA | 12 | 55 | 1.285 | 1361 | 11 | 100 |
| 35 | 88 | BMA | 12 | 75 | 1.307 | 1402 | 72 | 100 |
| 36 | 86 | EMA[2] | 14 | 75 | 1.248 | 1358 | 100 | 78 |
| 37 | 91 | DDMA[3] | 9 | 75 | 1.271 | 1343 | 100 | 6 |
| 38 | 90 | ODMA[4] | 10 | 75 | 1.304 | 1370 | 100 | 0 |

[1]BMA = butyl methacrylate
[2]EMA = ethyl methacrylate
[3]DDMA = dodecyl methacrylate
[4]ODMA = octadecyl methacrylate

What is claimed is:

1. A solid crack propagation resistant molded acrylic material comprising a copolymer prepared from about 76 to about 94 weight percent methyl methacrylate and from about 24 to about 6 weight percent of a lower alkyl methacrylate, said alkyl group containing from 2 to 4 carbon atoms, and when said lower alkyl methacrylate is ethyl methacrylate the copolymer is prepared from at least 12 weight percent ethyl methacrylate.

2. The solid crack propagation resistant molded acrylic material of claim 1 comprising a copolymer prepared from about 86 to about 94 weight percent methyl methacrylate and from about 14 to about 6 weight percent butyl methacrylate.

3. The solid crack propagation resistant molded acrylic material of claim 1 comprising a copolymer prepared from about 76 to about 88 weight percent methyl methacrylate and from about 24 to about 12 weight percent ethyl methacrylate.

4. An indoor ballistic glazing material comprising the solid crack propagation resistant molded acrylic material of claim 1 having an average thickness of at least 1,250 inches.

5. The indoor ballistic glazing material of claim 4 being a cast sheet.

6. The solid crack propagation resistant molded acrylic material of claim 2 further comprising a copolymer prepared from about 86 to about 90 weight percent methyl methacrylate and from about 14 to about 10 weight percent butyl methacrylate.

7. An indoor and outdoor ballistic glazing material comprising a cast sheet having an average thickness of about 1.250 inches prepared from the material of claim 6.

8. The solid crack propagation resistant molded material of claim 3 further comprising a copolymer prepared from about 76 weight percent methyl methacrylate and 24 weight percent ethyl methacrylate.

9. An indoor and outdoor ballistic glazing material comprising a cast sheet prepared from the copolymer of claim 8 and having an average thickness of about 1.250 inches.

10. A bullet-resisting material comprising a copolymer prepared from about 88 weight percent methyl methacrylate and about 12 weight percent butyl methacrylate, said material having an average thickness of at least about 1.250 inches.

11. A bullet-resisting material comprising a copolymer prepared from about 76 weight percent methyl methacrylate and about 24 weight percent ethyl methacrylate having an average thickness of at least about 1.250 inches.

12. A method for improving the crack propagation resistance of a solid, molded polymethyl methacrylate article comprising copolymerizing from about 76 to about 94 weight percent methyl methacrylate with from about 24 to about 6 weight percent of a lower alkyl methacrylate, said alkyl group containing from 2 to 4 carbon atoms, and where said lower alkyl methacrylate is ethyl methacrylate the copolymer is formed from at least 12 weight percent ethyl methacrylate, and molding the copolymer into a solid.

13. The method of claim 12 further comprising copolymerizing from about 86 to about 94 weight percent methyl methacrylate with from about 14 to about 6 weight percent butyl methacrylate.

14. The method of claim 12 further comprising copolymerizing from about 76 to about 88 weight percent methyl methacrylate with from about 24 to about 12 weight percent ethyl methacrylate.

15. The method of claim 12 further comprising forming a cast sheet having an average thickness of at least 1.250 inches.

16. The method of claim 12 further comprising copolymerizing from about 86 to about 90 weight methyl methacrylate with about 14 to about 10 weight percent butyl methacrylate.

17. The method of claim 12 further comprising copolymerizing about 76 weight percent methyl methacrylate with about 24 weight percent ethyl methacrylate.

18. An indoor and outdoor ballistic glazing material prepared according to the method of claim 16.

19. An indoor and outdoor ballistic glazing material prepared according to the method of claim 17.

20. A method for preparing a bullet-resisting solid sheet comprising copolymerizing about 88 weight percent methyl methacrylate and about 12 weight percent butyl methacrylate, and casting said copolymer into a sheet having an average thickness of at least about 1.250 inches.

21. An indoor and outdoor bullet-resisting sheet prepared according to the method of claim 20.

22. An indoor, high power small arms, bullet resisting sheet formed from the material of claim 10.

* * * * *